(12) United States Patent
Edwards

(10) Patent No.: US 10,462,152 B2
(45) Date of Patent: Oct. 29, 2019

(54) SYSTEMS AND METHODS FOR MANAGING CREDENTIALS USED TO AUTHENTICATE ACCESS IN DATA PROCESSING SYSTEMS

(71) Applicant: Microsoft Technology Licensing, LLC, Redmond, WA (US)

(72) Inventor: Daniel Edwards, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 162 days.

(21) Appl. No.: 15/351,928

(22) Filed: Nov. 15, 2016

(65) Prior Publication Data

US 2018/0139193 A1 May 17, 2018

(51) Int. Cl.
*H04L 29/06* (2006.01)

(52) U.S. Cl.
CPC ........ *H04L 63/108* (2013.01); *H04L 63/0815* (2013.01)

(58) Field of Classification Search
USPC .......................................................... 726/4
See application file for complete search history.

(56) References Cited

U.S. PATENT DOCUMENTS

| | | | |
|---|---|---|---|
| 7,353,536 B1 | 4/2008 | Morris et al. | |
| 8,132,046 B2 | 3/2012 | Varghese | |
| 8,539,567 B1* | 9/2013 | Logue | H04L 63/0884 726/7 |
| 9,355,233 B1 | 5/2016 | Chen et al. | |
| 9,923,927 B1* | 3/2018 | McClintock | H04L 63/20 |
| 10,007,779 B1* | 6/2018 | McClintock | G06F 21/45 |
| 2006/0271789 A1 | 11/2006 | Satomura et al. | |
| 2007/0124807 A1 | 5/2007 | Jau | |
| 2008/0046753 A1* | 2/2008 | Fusari | G06F 21/34 713/186 |
| 2009/0210938 A1 | 8/2009 | Childress et al. | |
| 2009/0259512 A1* | 10/2009 | Larkins | G06F 21/6218 726/29 |
| 2009/0320108 A1* | 12/2009 | Livingston | G06F 21/31 726/6 |

(Continued)

OTHER PUBLICATIONS

"New tool to reset passwords on services and scheduled tasks across multiple remote servers", https://blog.cjwdev.co.uk/2012/06/08/new-tool-to-reset-passwords-on-services-and-scheduled-tasks-across-multiple-remote-servers/, Published on: Jun. 8, 2012, 9 pages.

*Primary Examiner* — Harris C Wang
(74) *Attorney, Agent, or Firm* — Workman Nydegger

(57) ABSTRACT

A system receives a first request to replace a first credential used by an entity to access one or more resources with a second credential to be used by the entity to access the one or more resources. In response to receiving the first request, the system replaces the first credential with the second credential and allows use of the first credential for a predetermined period. In response to receiving a second request from the entity to access the one or more resources using the first credential after replacing the first credential with the second credential, the system allows the entity to access the one or more resources using the first credential during the predetermined period, and generates an indication that the entity used the first credential to access the one or more resources and that the entity is to be updated with the second credential within the predetermined period.

20 Claims, 5 Drawing Sheets

(56) References Cited

U.S. PATENT DOCUMENTS

| | | |
|---|---|---|
| 2010/0146602 A1 | 6/2010 | Delia et al. |
| 2011/0029782 A1 | 2/2011 | Havercan |
| 2011/0265160 A1 | 10/2011 | Nettleton |
| 2012/0060213 A1 | 3/2012 | Childress et al. |
| 2015/0195705 A1 | 7/2015 | Mullins |
| 2015/0286816 A1 | 10/2015 | Adler et al. |
| 2016/0028714 A1* | 1/2016 | Umberger ............... G06F 8/654 726/18 |
| 2018/0139193 A1* | 5/2018 | Edwards ............... H04L 63/108 |

* cited by examiner

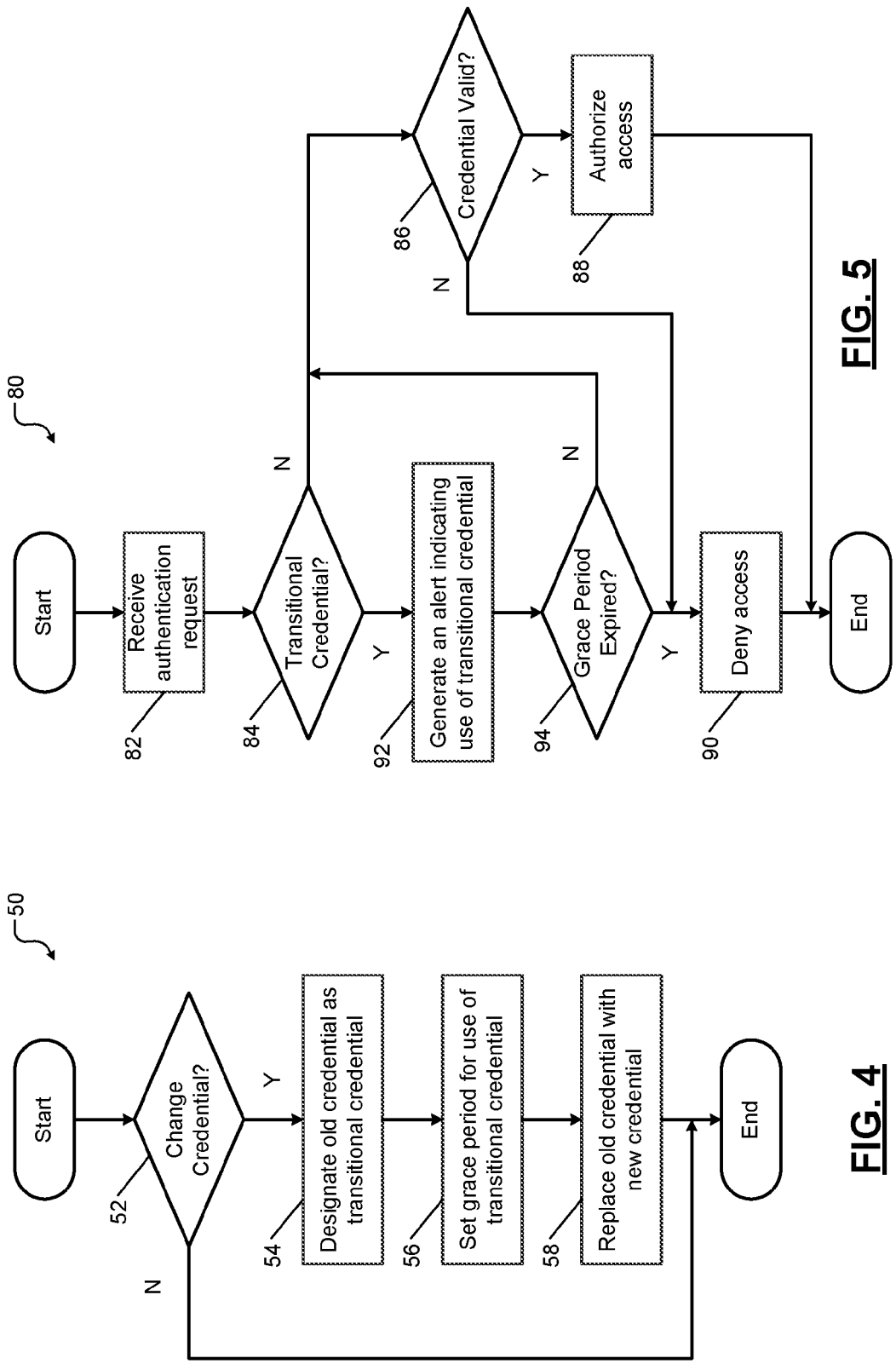

SYSTEMS AND METHODS FOR MANAGING CREDENTIALS USED TO AUTHENTICATE ACCESS IN DATA PROCESSING SYSTEMS

FIELD

The present disclosure relates generally to data processing systems and more particularly to systems and methods for managing credentials used to authenticate access in data processing systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Authentication systems typically associate a single secret (i.e., credential or identifying information such as a password, a certificate, or biometric data) with an entity. For example, an entity may be granted or denied access to one or more resources based on a single password. When the password expires or is deliberately changed, the password is reset. That is, an existing (old) password is changed and replaced with a new password. When the password is reset, the old password is immediately invalidated and cannot be used.

In certain environments, such as services running on servers, a service executes on a server as an entity. Unique identifying information is tied to the service. A central authentication system uses the identifying information for authenticating access by the service to one or more resources. When a password for a service account (an account associated with a service) is reset in the central authentication system, the new password needs to be updated on every server that uses the service account. Failure to update the new password on a machine prevents the service from executing on that machine since the old password used by the service on that machine is no longer valid.

For example, a series of front-end systems may ingest data and transmit the data to various backend systems. It is common, while not advised, that the front-end systems all use the same entity for authentication to a backend system. If the entity used by the front-end systems to authenticate with the backend system has the password changed then all the front-end systems need to be updated to use the new password. However, at times the administrators might not readily know where an entity is being used within their services (e.g., may not be documented and/or may be forgotten). Accordingly, when failures occur on these devices after resetting the password in the central authentication system, the failures may be the only way to discover these devices, after which the new password can be updated on these devices. This leads to potentially service impacting disruptions.

SUMMARY

A system comprises a processor and memory, and machine readable instructions stored in the memory and executed by the processor. The machine readable instructions are configured to receive a first request to replace a first credential used by an entity to access one or more resources with a second credential to be used by the entity to access the one or more resources. In response to receiving the first request, the machine readable instructions are configured to replace the first credential with the second credential and to allow use of the first credential for a predetermined period. In response to receiving a second request from the entity to access the one or more resources using the first credential after replacing the first credential with the second credential, the machine readable instructions are configured to allow the entity to access the one or more resources using the first credential during the predetermined period, and to generate an indication that the entity used the first credential to access the one or more resources and that the entity is to be updated with the second credential within the predetermined period.

In other features, the machine readable instructions are further configured to allow the entity to use the second credential to access the one or more resources.

In other features, the machine readable instructions are further configured to invalidate the first credential after the predetermined period expires, and to deny the entity access to the one or more resources using the first credential after the predetermined period expires.

In other features, the machine readable instructions are further configured to indicate an attempt by the entity to access the one or more resources using the first credential after the predetermined period expires.

In other features, the machine readable instructions are further configured to identify one or more devices from which the entity makes an unauthorized attempt to access the one or more resources by detecting an attempt by the entity from the one or more devices to access the one or more resources using the first credential after the predetermined period expires.

In other features, after replacing the first credential with the second credential, allowing the entity to use the first credential to access the one or more resources during the predetermined period prevents the replacement from causing a failure during the predetermined period.

In other features, after replacing the first credential with the second credential, allowing the entity to use the first credential to access the one or more resources during the predetermined period provides time within the predetermined period for updating the entity with the second credential.

In other features, the machine readable instructions are further configured to identify one or more devices that use the entity by detecting an attempt by the entity from the one or more devices to access the one or more resources using the first credential.

In still other features, a method comprises receiving a first request to replace a first credential used by an entity to access one or more resources with a second credential to be used by the entity to access the one or more resources. The method further comprises replacing, in response to receiving the first request, the first credential with the second credential and allow use of the first credential for a predetermined period. In response to receiving a second request from the entity to access the one or more resources using the first credential after replacing the first credential with the second credential, the method further comprises allowing the entity to access the one or more resources using the first credential during the predetermined period, and indicating that the entity used the first credential to access the one or more resources and that the entity is to be updated with the second credential within the predetermined period.

In other features, the method further comprises allowing the entity to use the second credential to access the one or more resources.

In other features, the method further comprises invalidating the first credential after the predetermined period expires, and denying the entity access to the one or more resources using the first credential after the predetermined period expires.

In other features, the method further comprises indicating an attempt by the entity to access the one or more resources using the first credential after the predetermined period expires.

In other features, the method further comprises identifying one or more devices from which the entity makes an unauthorized attempt to access the one or more resources by detecting an attempt by the entity from the one or more devices to access the one or more resources using the first credential after the predetermined period expires.

In other features, the method further comprises after replacing the first credential with the second credential, by allowing the entity to use the first credential to access the one or more resources during the predetermined period, preventing the replacement from causing a failure during the predetermined period.

In other features, the method further comprises after replacing the first credential with the second credential, by allowing the entity to use the first credential to access the one or more resources during the predetermined period, providing time within the predetermined period for updating the entity with the second credential.

In other features, the method further comprises identifying one or more devices that uses the entity by detecting an attempt by the entity from the one or more devices to access the one or more resources using the first credential.

In still other features, a system comprises a processor and memory, and machine readable instructions. When executed by the processor and memory, the machine readable instructions are configured to replace a first identifying information used by an entity to access a resource with a second identifying information to be used by the entity to access the resource. In response to receiving a request from the entity to access the resource using the first identifying information after replacing the first identifying information with the second identifying information, the machine readable instructions are configured to allow the entity to access the resource using the first identifying information for a predetermined period, and to indicate that the entity used the first identifying information to access the resource and that the entity is to be updated with the second identifying information within the predetermined period.

In other features, the machine readable instructions are further configured to deny the entity access to the resource using the first identifying information after the predetermined period expires.

In other features, the machine readable instructions are further configured to indicate an attempt by the entity to access the resource using the first identifying information after the predetermined period expires as an unauthorized attempt.

In other features, after replacing the first identifying information with the second identifying information, allowing the entity to use the first identifying information to access the resource during the predetermined period prevents the replacement from causing a failure during the predetermined period and provides time within the predetermined period for updating the entity with the second identifying information.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 4 is a flowchart of a method for designating an old credential a transitional credential status after the old credential has been replaced with a new credential on the authentication server according to the present disclosure;

FIG. 5 is a flowchart of a method for authenticating a request to access resources using the transitional credential during a predetermined period and for generating alerts when access is requested using the transitional credential according to the present disclosure;

In the drawings, reference numbers may be reused to identify similar and/or identical elements.

DESCRIPTION

Figure 1:
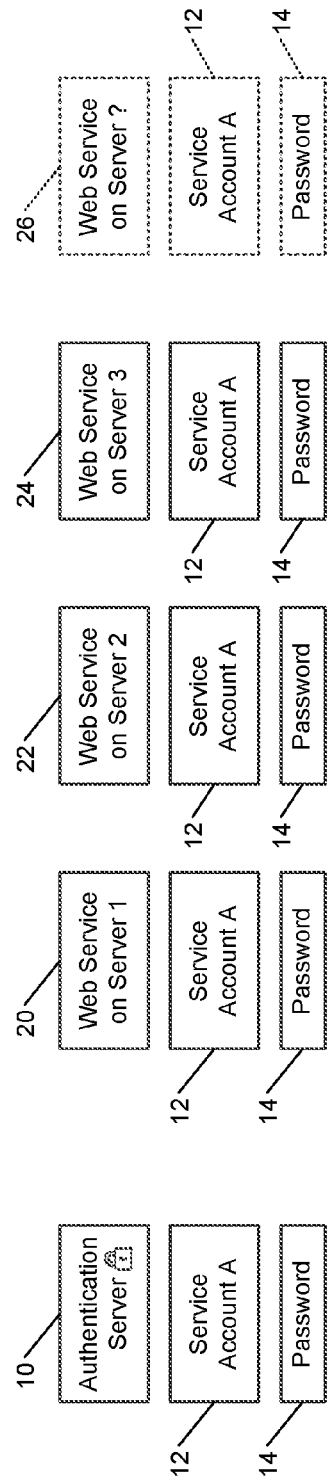
FIG. 1 shows a simplistic schematic representation of a data processing system including an authentication server and a plurality of servers.

In a cloud environment, data is protected by complex authentication systems that ensure only the right people/systems can access the data. In the cloud environment, authentication is driven by secrets that are rotated (changed) on a frequent basis to remain protected. This is a complex process that in a 24/7 world is only made more difficult due to two problems: first, knowing where a secret is being used from; and second, avoiding outages (failures) during secret rotations. More specifically, the first problem is being able to identify where an old secret that needs to be updated with the new secret is still being used before causing an outage (failure). The second problem is enabling the updating of the new secret over a period of time rather than having to change it everywhere at once.

The present disclosure solves both these problems by providing a transitional secret procedure. In the transitional secret procedure, when an old secret is changed and replaced by a new secret, the old secret is not immediately invalidated. Rather, the old secret is given a transitional status. That is, the old secret is kept valid for a limited amount of time, after which the old secret expires. This provides a predetermined and configurable grace period (e.g., 48 hours)

within which the new secret can be updated (rolled out) wherever the old secret was being used by an entity to access resources. Additionally, the grace period may be based on the level of access associated with the user. For example, in some scenarios it may be advantageous to maintain smaller grace periods for privileged user accounts.

During the grace period, the central authentication system grants the entity access to a resource when the entity attempts to access the resource using the new secret as well as the old secret (now called transitional secret). In addition, whenever the entity attempts to access the resource using the transitional secret, an alert is issued to a system administrator. The alert informs the system administrator from which device the entity attempted to access the resource using the transitional secret. The alert allows the system administrator time to update the entity on that device with the new secret within the grace period. After the grace period expires, such alerts can also indicate unauthorized or malicious attempts to access resources using the old secret.

Accordingly, the systems and methods of the present disclosure support two active secrets used for authenticating access to resources by an entity during a transition period, with one of the secretes (the old secret) having a limited life during the transition period during which the new secret is rolled out and after which the old secret is invalidated. When the secret is changed, the new secret immediately becomes the official secret for the entity to access resources, with all the traditional features such as expiration date and so on assigned thereto by the system administrator. The old secret is not immediately invalidated but is stored in a separate field called a transitional secret field, for example, with a separate expiration date is assigned thereto by the system administrator. Access to resources is granted when either the new or the transitional secret is used by the entity, except that the use of the transitional secret to access resources is limited to a short grace period. The entity is allowed to use the transitional secret to access the resources only during the grace period. Each time the entity uses the transitional secret to access the resources during the grace period, an alert is generated to inform the system administrator, who can then update the entity with the new secret within the grace period based on the alert.

Thus, with this approach the expired/existing old secret is given a transitional status with a date on which the transitional status will expire. While still being valid for authentication, the use of the transitional secret generates alerts, which solves the first problem of knowing where a secret is being used from. Upon the expiration date, the transitional status is removed, and the old secret is purged, blocked, or invalidated. Further, after the old secret is given the transitional status, the old valid secret is replaced with a new secret, and administrators use the new secret to update clients. This approach allows the administrators to slowly update the impacted systems, which solves the second problem of avoiding/preventing outages (failures) during secret rotations.

The dual secret system proposed in the present disclosure is different than simply using two secrets running in parallel. This because when simply two secrets running in parallel are used, one of the secrets does not have a limited life like the proposed transitional secret does. Rather, one of the secrets has to be specifically revoked by the system administrator. Further, when simply two secrets running in parallel are used, such secrets are indistinguishable from each other and therefore cannot provide the alert feature provided by the proposed transitional secret.

The central authentication system can allow administrators to decide whether to support the transitional secret procedure. That is, use of the transitional secret feature can be enabled or disabled by an administrator. When the use of the transitional secret feature is supported and enabled, only the central authentication system knows about the existence of the transitional secret. The transitional secret procedure is transparent to the rest of the devices in the computing environment authenticated by the central authentication system.

Further, the systems and methods of the present disclosure also limit the usage of the transitional secret so as to prevent an entity from maliciously reusing the old secret to again reset the new secret. Only the new secret can be used to reset the new secret. The transitional secret cannot be used to reset the new secret.

Additionally, in some instances, when an entity resets a secret, the entity may be prompted to first logout immediately upon resetting the secret and then re-login using the new secret. The systems and methods of the present disclosure obviate such a need, which can be a nuisance. According to the systems and methods of the present disclosure, the new secret is effective immediately. The old secret is not invalidated immediately. The old secret remains valid as a transitional secret for a predetermined period.

The teachings of the present disclosure can be applied to any form of authentication. For example, the form of authentication may include password-based authentication, certificate-based authentication, biometric data based authentication, and so on. The teachings can be incorporated in any directory service that offers authentication. The teachings can be implemented across multiple servers performing authentication.

The present disclosure is organized as follows. The teachings of the present disclosure are explained with reference to FIGS. 1-5. A simplistic example of a distributed environment in which the systems and methods of the present disclosure can be implemented is presented and described with reference to FIGS. 6-8.

FIG. 1 shows a simplistic schematic representation of a system including an authentication server 10. The authentication server 10 maintains credentials for a service account used by a web service running on several servers 20-26. The authentication server 10 authenticates access to resources by the web service using the service account.

Service accounts are used to run services on many systems. For example, the authentication server 10 maintains a service account A 12. The service account A 12 uses a password 14 as a credential or identifying information. The authentication server 10 grants or denies entities access to resources when the entities request access to the resources using the service account A 12. For example, an entity shown as a web service may be running on several servers shown as server A 20, server B 22, server C 24, and so on. In addition, there may be one or more servers 26 that execute the web service and that use the same service account A 12 to access resources. The existence such servers 26, however, may be undocumented and/or forgotten, and such servers 26 may therefore be unknown.

On each server 20-26, the entity web service uses the service account A 12 to access resources. That is, when the entity on any server requests access to a resource, the entity presents the password 14 associated with the service account A 12 as a credential based on which the authentication server 10 can decide whether to grant or deny the entity access to the requested resource. On receiving a request to authenticate access to a resource from the entity running on one of the servers 20-26, the authentication server 10 verifies the credential. For example, the authentication server 10 compares the password 14 presented by the entity in the authentication request to the password 14 associated with the server account 12 stored on the authentication server 10. If the two match, the authentication server 10 grants the entity the access to the resource. If the two do not match, the authentication server 10 denies the entity the access to the resource.

Due to human error, the usage of a particular service account on a particular server (e.g., the server 26) might be undocumented and/or forgotten. When the password 14 for the service account A 12 is reset on the authentication server 10, the web service running on such a server 26 still uses the old password and therefore fails unexpectedly and causes an outage. In addition, during the time between the password reset on the authentication server 10 and updating the new password on the servers 20-26, the services on these devices remain unavailable since these services still use the old password which fails authentication.

Figure 2:
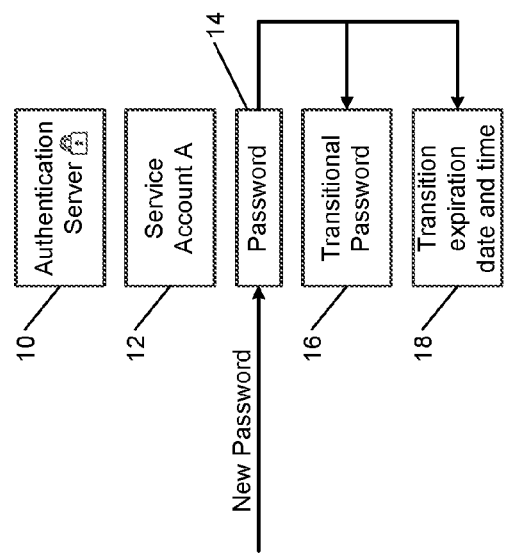
FIG. 2 shows a schematic of an authentication system using a transitional credential according to the present disclosure.

FIG. 2 shows a schematic of the transitional password approach according to the present disclosure. When the existing password 14 for the service account A 12 is reset (changed to or replaced by a new password) at the authentication server 10, the existing password 14 is moved to a transitional password field 16 in the directory services at the authentication server 10. In addition, an expiration date 18 is specified for the transitional password 16 which is the date after which the directory services will no longer honor the transitional password 16.

After the password reset at the authentication server 10, to prevent the entity using the service account A 12 from failing at the one or more servers 20-26, the administrators need to change the old password 14 to the new password at the servers 20-26 before the expiration date 18, which is when the transitional password 16 will expire. After the password reset and before the expiration date 18, if the password 14 at one or more of the servers 20-26 is not yet changed, the transitional password 16 at the authentication server 10 allows the entity from the one or more of the servers 20-26 to still use the old password 14. The authentication server 10 grants the entity access to the resources since the old password 14 presented by the entity from one or more of the servers 20-26 matches the transitional password 16 at the authentication server 10. This prevents the entity (e.g., the web service) from failing at the one or more of the servers 20-26 although the new password is not yet updated (rolled out) at the one or more of the servers 20-26.

In addition, the authentication server 10 generates an alert each time an authentication request including the old password 14 is received from the entity at the one or more of the servers 20-26 where the new password is not yet updated (rolled out). The alert allows the administrators to identify from which server the authentication request including the old password 14 was received and to update the entity on that server with the new password before the expiration date 18, which is when the transitional password 16 will expire.

Figure 3:
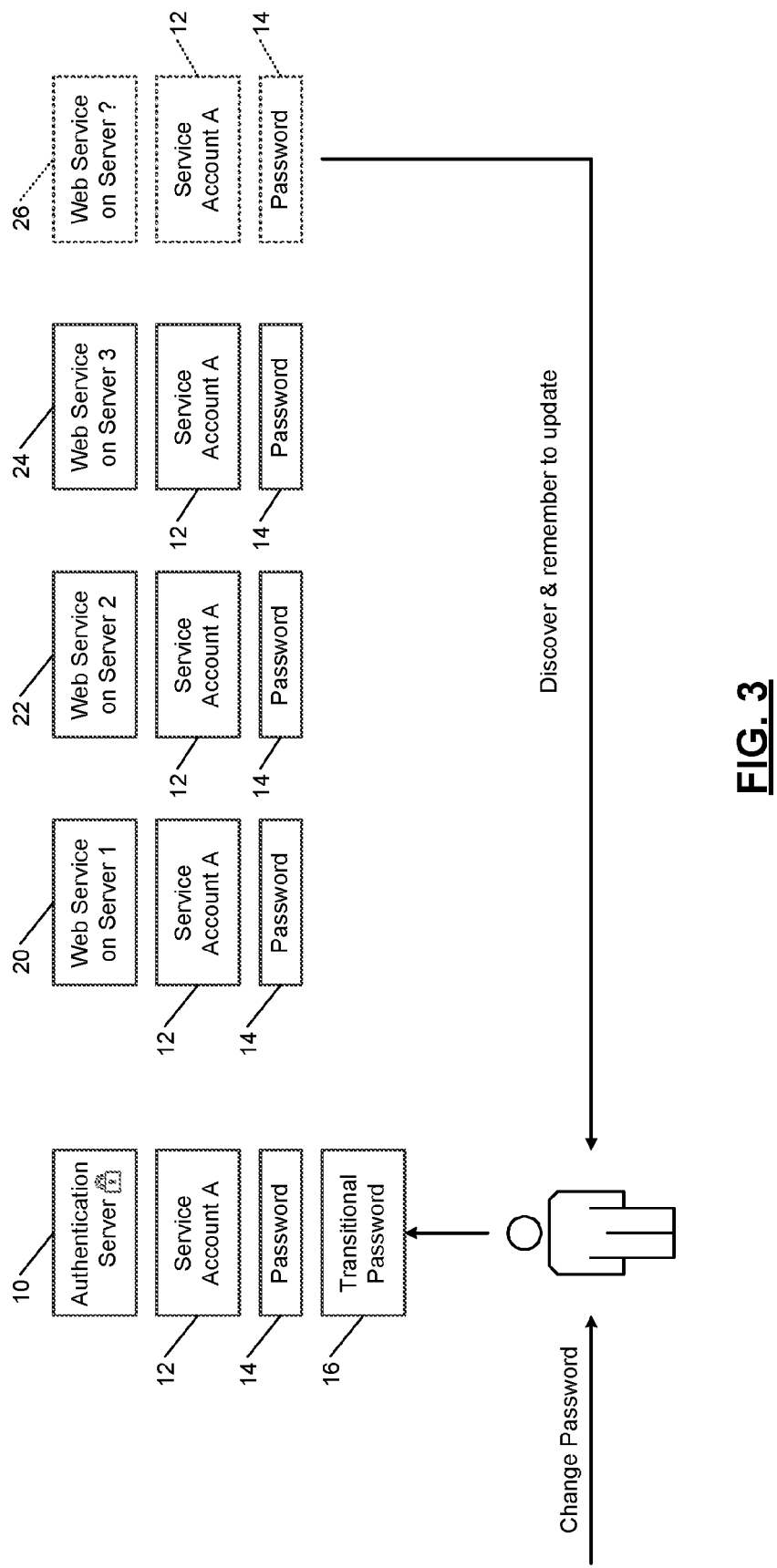
FIG. 3 illustrates an alert generated by the authentication server when an entity on a server requests access to resources using an old credential after the old credential has been replaced with a new credential on the authentication server.

FIG. 3 shows that the alert is generated when the entity on the unknown server 26, which is not yet updated with the new password, requests authentication using the old password 14. The alert helps the system administrator to identify the unknown server 26 and update the entity on that server with the new password before the expiration date 18, which is when the transitional password 16 will expire.

Thus, the alerts generated due to the transitional password 16 can be monitored by systems administrators. The alerts notify the systems administrators of the fact that there are still login attempts being made by the entity from one or more devices with the old password 14. The alerts provide multiple benefits including the following. The alerts inform the system administrators where credentials might need to be changed to ensure operational stability. The alerts inform the system administrators where potentially unauthorized usage of a service account may be occurring. The alerts enable the system administrators to easily understand where a service account or an entity is being used.

FIG. 4 shows a method 50 for designating the old credential as the transitional credential for a limited time after the old credential has been replaced with the new credential on the authentication server 10 according to the present disclosure. As used herein, control refers to an authentication system running on an authentication server such as the authentication server 10 shown and described with references to FIGS. 1-3. At 52, control determines whether a request to change or replace the existing credential associated with the service account with a new credential is received. At 54, in response to receiving a request to change the existing credential, control designates the existing credential as transitional credential. At 56, control assigns a predetermined period of the grace period during which use of the transitional credential will be allowed and after which the use of the transitional credential will be disallowed. At 58, control replaces the existing credential associated with the service account with the new credential.

FIG. 5 shows a method 80 for authenticating access using the transitional credential during the grace period and for generating alerts when access is requested using the transitional credential. As used herein, control refers to an authentication system running on an authentication server such as the authentication server 10 shown and described with references to FIGS. 1-3. At 82, control receives an authentication request from an entity (e.g., a web service running on one or more servers 20-26 shown and described with references to FIGS. 1-3). At 84, control determines whether the credential presented by the entity in the authentication request is the transitional credential or the new credential. At 86, if the credential presented by the entity in the authentication request is the new credential, control determines whether the new credential is valid. At 88, control authorizes the entity access to the requested resources if the new credential is valid. At 90, control denies the entity access to the requested resources if the new credential is invalid.

At 92, if the credential presented by the entity in the authentication request is the transitional credential, control generates an alert indicating use of the transitional credential. This alert allows the system administrator to identify which machine the authentication request including the transitional credential came from. Additionally, this alert provides the system administrator time to update the entity and that machine with the new credential within the grace period assigned to the transitional credential.

At 94, in addition to generating the alert, control checks whether the grace period for the transitional credential has expired. At 86, if the grace period for the transitional credential has not expired, control determines whether the transitional credential is valid. At 88, control authorizes the entity access to the requested resources if the transitional credential is valid. At 90, control denies the entity access to the requested resources if the transitional credential is invalid.

The systems and methods of the present disclosure may also adjust (control) the availability of the transitional credentials and/or the duration for which the transitional credentials based on different conditions. The systems and methods may use several conditions to determine whether a transitional credential is available (i.e., granted or denied) and to determine the length of duration for which the transitional credential can remain valid when the transitional credential is available.

For example, these conditions may include but are not limited to the following: privilege rights of the user requesting the transitional credential, whether the request for the transitional credential originates from a new device or old device, the location of the device from where the request for the transitional credential originates, and so on (see examples below). The systems and methods of the present disclosure can use these conditions as security features to determine when and how the transitional credential is available. Further, the authentication system may provide limited access to resources whenever the transitional credential is used (e.g., such limited access may be called a safe mode of the authentication system).

An example of the privilege rights based grant of the transitional credential can include the following. If a systems administrator requests the transitional credential, the systems administrator can be granted full access to resources when using the transitional credential and can also be allowed to use the transitional credential for a relatively longer duration than a user who is not a systems administrator.

An example of the device based grant of the transitional credential can include the following. If the request for the transitional credential originates from a new device (i.e., a device unknown or unfamiliar to the authentication system based on its prior usage of, or association with, the authentication system), the transitional credential can be used for limited access to resources and for a relatively short duration than if the request for the transitional credential originates from an existing device that has been using the old credential (which is now the transitional credential) for a considerable period of time or a relatively long duration, and is therefore known or familiar to the authentication system based on its prior usage of, or association with, the authentication system.

An example of the location based grant of the transitional credential can include the following. If the request for the transitional credential originates from a device geographically remote from the authentication system or a device roaming in a particular geographic location (e.g., a country or a part of the country that is deemed unsafe or insecure), the transitional credential can be used for limited access to resources and for a relatively short duration than if the request for the transitional credential originates from a device at a location that is known or familiar to the authentication system based on its prior usage of, or association with, the authentication system, and is therefore considered safe enough to grant more than limited access (e.g., full access) to resources and for a relatively long duration using the transitional credential. Additional examples are contemplated.

In addition, the systems and methods of the present disclosure may determine the acceptance of a transitional credential, the availability of the transitional credential feature, and the expiration or duration of the transitional credential. Non-limiting examples of each follow.

For example, the systems and methods of the present disclosure may determine the acceptance of a transitional credential based on several factors. Examples of the factors include but are not limited to the following: whether the transitional credential feature is enabled for the entity requesting the transitional credential, whether the transitional credential is correct, whether the system requesting authentication can reject the use of a transitional password based on local policies of the system, and so on.

Further, the systems and methods of the present disclosure may determine the availability of the transitional credential feature as follows. For example, the transitional credential feature may be made available on an entity by entity basis based on various criteria. For example, only members of a specific group may be allowed to use the transitional credential feature, and conversely everyone but a single group may be allowed to use the transitional credential feature. Both the authenticating system and the entity requesting the transitional credential can have respective policies about when to accept a transitional credential. For example, a server may have a policy where only accounts that are not enabled for interactive login can support transitional credentials. Another method for determining the availability of the transitional credential feature may be the type of entity requesting the transitional credential. For example, a credential in the form of a computer certificate may not be supported as a transitional credential since the system that provisions the certification is automated, and therefore this scenario cannot exist. Other examples are contemplated.

Further, the systems and methods of the present disclosure may determine the expiration of the transitional credential in many ways. For example, the expiration of the transitional credential can support a flexible model tying policies both to an individual entity as well as higher levels of aggregation such as systems administrators. Other methods for determining the expiration of the transitional credential are contemplated.

Below are simplistic examples of a distributed computing environment in which the systems and methods of the present disclosure and the data processing systems described above can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 6:
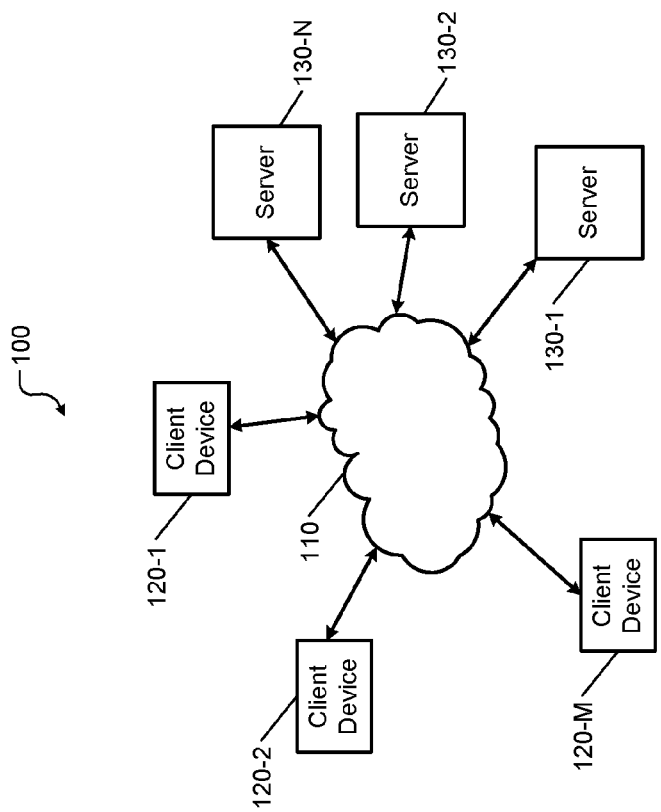
FIG. 6 is a functional block diagram of an example of a distributed network system including multiple servers and an authentication server that can implement the systems and methods for managing credentials used to authenticate access to resources according to the present disclosure.

FIG. 6 shows a simplified example of a distributed network system 100 that can execute an authentication system and that can implement the systems and methods for managing credentials used to authenticate access to resources according to the present disclosure. The distributed network system 100 includes a network 110, one or more client devices 120-1, 120-2, . . . , and 120-M (collectively client devices 120), and one or more servers 130-1, 130-2, . . . , and 130-N (collectively servers 130), where M and N are integers greater than or equal to one. The network 110 may include a local area network (LAN), a wide area network (WAN) such as the Internet, or other type of network (collectively shown as the network 110). The client devices 120 may communicate with one or more servers 130 via the network 110. The client devices 120 and the servers 130 may connect to the network 110 using wireless and/or wired connections to the network 110. For example, the client devices 120 may include smartphones, personal digital assistants (PDAs), laptop computers, personal computers (PCs), and so on. The servers 130 may provide multiple services to the users of the client devices 120. The servers 130 may host multiple databases that are utilized by the various services and that are used by the users of the client devices 120.

One or more of the servers 130 may execute entities or services such as the web service shown and described with references to FIGS. 1-3. The web service may run on the one or more of the servers 130 as an entity and may use a service account associated with the entity, such as the service account A 12 shown and described with references to FIGS. 1-3, to access one or more resources on the distributed network system 100. One or more of the servers 130 may function as the authentication server 10 shown and described with references to FIGS. 1-3 and may execute the systems and methods for managing credentials of the entities as described with references to FIGS. 1-5.

Figure 7:
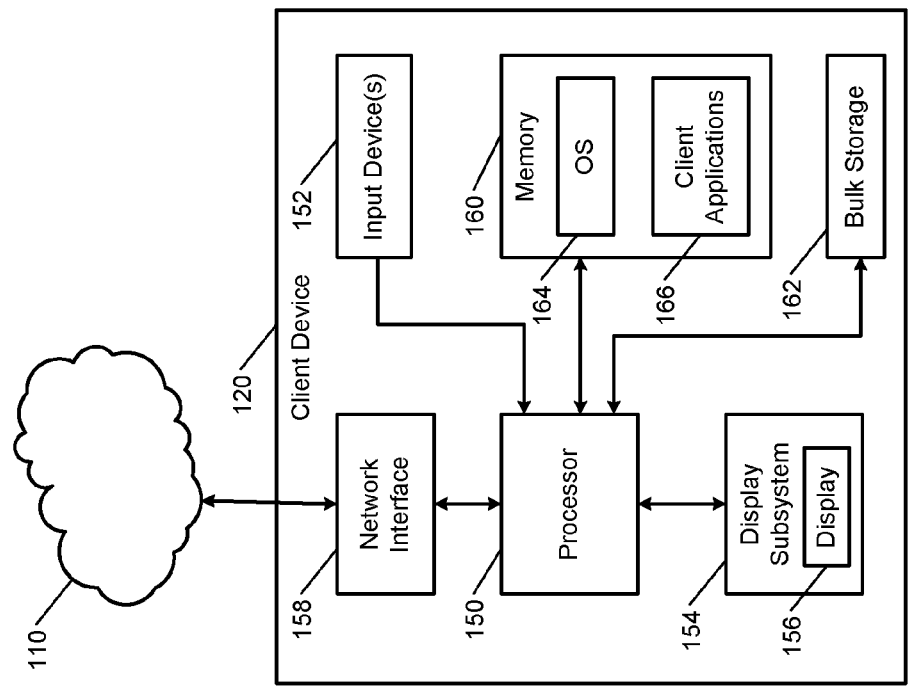
FIG. 7 is a functional block diagram of an example of a client device.

FIG. 7 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses one or more data processing systems executed by one or more of the servers 130 via the network 110.

Figure 8:
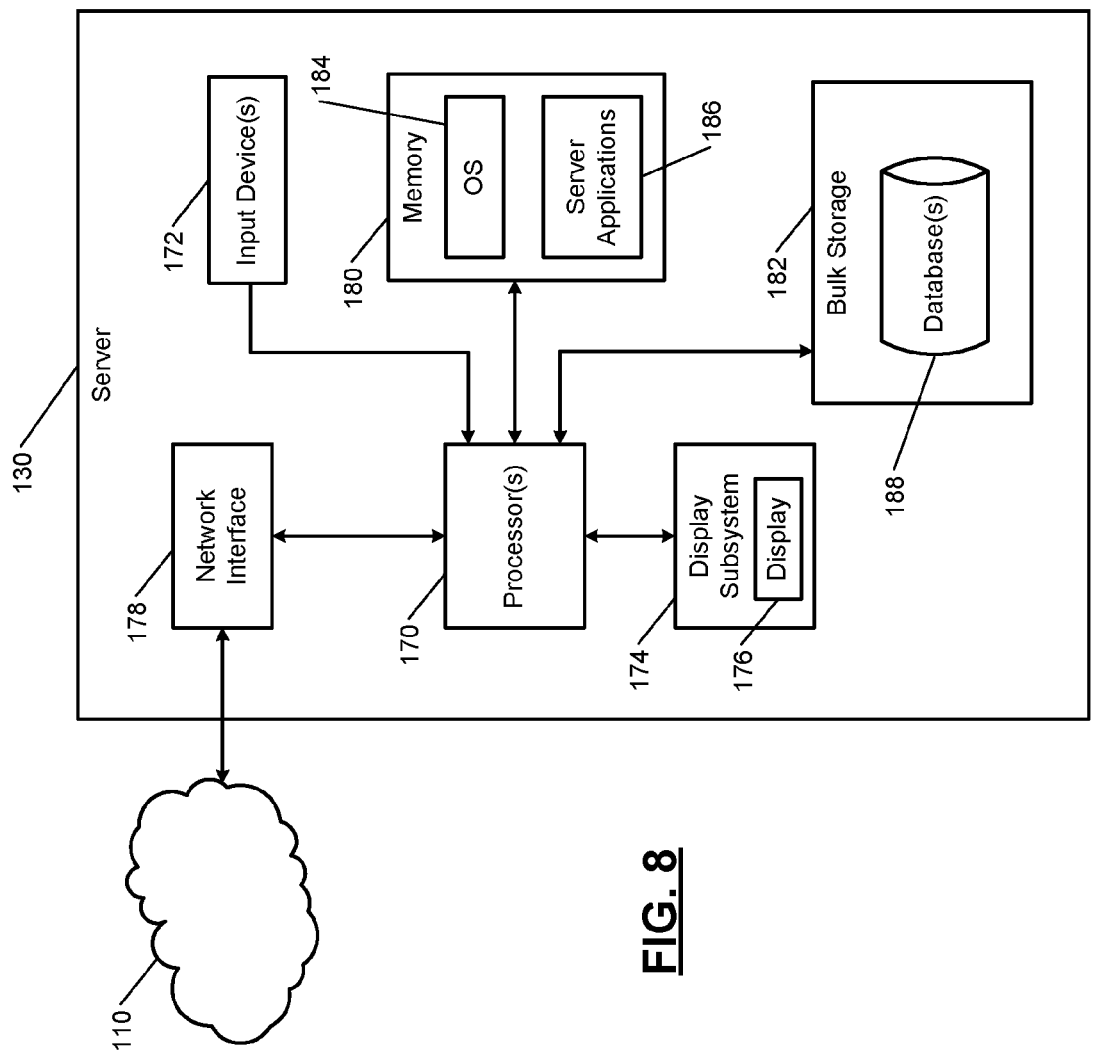
FIG. 8 is a functional block diagram of an example of a server.

FIG. 8 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 other servers 130 and to the distributed network system 100 via the network 110, forming a cluster of the servers 130. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device. The bulk storage 182 may store one or more databases 188 that store data structures used by the server applications 186 to perform respective functions.

The processor 170 of the server 130 executes an operating system (OS) 184 and one or more server applications 186, which include the one or more data processing systems, and the authentication system, and the systems and methods for managing credentials of the entities as described with references to FIGS. 1-5.

In use, one or more of the servers 130 may perform authentication services including maintaining service accounts for entities running on other servers 130. When a credential for a service account is changed, the authentication server makes the new credential the official credential effective immediately and designates the old credential as a transitional credential and assigns an expiration date (a predetermined grace period) for the transitional credential. When an entity running on one of the servers 130 requests access to a resource using the new credential, the authentication server grants access as usual. When an entity running on one of the servers 130 requests access to a resource using the old credential since the entity on the server is not yet updated with the new credential, the authentication server does two things: First, the authentication server grants the entity access to the resource if the transitional period has not expired; and second, the authentication server generates an alert for the system administrator to finish updating the entity on the server with the new credential before the transitional period expires. In addition, the alerts can provide the system administrator an indication of a possibly malicious login attempt using the old credential if, for example, such an attempt is made from a server where the entity is already updated with the new credential and/or after the grace period has expired.

Thus, the systems and methods of the present disclosure solve two specific technical problems plaguing the authentication industry: knowing where a secret or credential is being used and avoiding outages (failures) during secret rotations. Providing the transitional credential and alerts when the transitional credential is used as described above allows the system administrators to learn where a secret or credential is being used and also prevents failures by not immediately discontinuing use of the old credential. Further, providing the transitional credential and alerts as described above allows the system administrators to update the entities with the new credential information in a timely manner (before the grace period for the transitional credential expires) without requiring that the updates be performed everywhere immediately when the old credential is replaced with the new credential. Thus, the transitional credential procedure is augmented by the additional alert feature as described above.

Further, the system administrators can ascertain from the alert generated due to the use of the transitional credential received in an authentication request from an entity running on a specific device as to exactly which device uses the entity and exactly where the entity needs to be updated with the new credential. All of these features allow the system administrators to know the status of the update process at a glance and to decide how to proceed (e.g., how to finish the update process) in a fast and efficient manner.

The functions/steps of designating a transitional status to an old credential upon replacing the old credential with a new credential, allowing the use of the transitional credential for a limited grace period in addition to allowing the use of the new credential rather than immediately discontinuing the use of the old credential, and providing alerts when the transitional credential is used provide specific information to the system administrators in the form of a technical tool and hence contribute to the technical solution of the technical problem of managing authentication credentials.

The systems and methods of the present disclosure solve the problem of outages that may be otherwise caused when the old credential is replaced with a new credential but is not immediately updated everywhere, by designating the old credential as a transitional credential for a predetermined short period and providing alerts when the transitional credential is used within the grace period, which, when applied in a concerted manner by the system administrators as described above, ensure a time-saving and well-manageable authentication operation as compared to the prior art. In the technical context of a central authentication system allowing entities to use service accounts to access resources, these functions combine to yield a fast, easy to handle, and in summary, an efficient credential management tool, which goes beyond the mere aggregation of normal design options.

The systems and methods of the present disclosure do not merely aid in completing the update process but also warn the system administrator of possible unauthorized use of the old credential as described above. Thus, the alerts generated based on the proposed transitional credential approach provide many benefits including the following: The alerts notify the systems administrators of the fact that there are still login attempts being made by the entity from one or more devices with the old credential. The alerts inform the system administrators where credentials might need to be changed to ensure operational stability. The alerts inform the system administrators where potentially unauthorized usage of a service account may be occurring. The alerts enable the system administrators to easily understand where a service account or an entity is being used. These are significant technical effects and improvements over the prior art in the technical field of credential management in centralized authentication systems.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a processor and memory; and
machine readable instructions stored in the memory and executed by the processor, configured to:
receive a first request to replace a first credential used to access one or more resources with a second credential that is to be subsequently used to access the one or more resources;
in response to receiving the first request, perform a transitional secret procedure by replacing the first credential with the second credential and by allowing temporary subsequent use of the first credential to access the one or more resources for a predetermined period, wherein a length of the predetermined period is based on a determined level of access associated with a requesting device that is using the first credential to request access to the one or more resources during the predetermined period, such that the predetermined period is different for different levels of access;
as a part of performing the transitional secret procedure, cause the transitional secret procedure to be transparent to the requesting device such that only the system, which operates as a central authentication system for granting or denying requests to access the one or more resources, is knowledgeable that both the first credential and the second credential are usable to access the one or more resources during the predetermined period; and
in response to receiving a second request to access the one or more resources using the first credential after replacing the first credential with the second credential, where the second request is received from the requesting device:
allow the requesting device to access the one or more resources using the first credential during the predetermined period, wherein both the first credential and the second credential are usable to access the one or more resources during the predetermined period, which is based on the determined level of access of the requesting device; and
generate an indication for a system administrator that the first credential was used to access the one or more resources.

2. The system of claim 1, wherein resetting the second credential is available only when the second credential is used to access the one or more resources such that the first credential cannot be used to reset the second credential.

3. The system of claim 1, wherein the machine readable instructions are further configured to:
invalidate the first credential after the predetermined period expires; and
deny access to the one or more resources when the first credential is used after the predetermined period expires.

4. The system of claim 1, wherein the machine readable instructions are further configured to indicate to the system administrator an attempt by a particular device that is attempting to access the one or more resources using the first credential after the predetermined period expires.

5. The system of claim 1, wherein the machine readable instructions are further configured to identify a particular device that is making an unauthorized attempt to access the one or more resources by detecting an attempt by the particular device to access the one or more resources using the first credential after the predetermined period expires.

6. The system of claim 1, wherein, after replacing the first credential with the second credential, an operation of allowing a particular device to use the first credential to access the one or more resources during the predetermined period is performed and operates to prevent the replacement from causing a failure due to the use of the first credential by the particular device during the predetermined period.

7. The system of claim 1, wherein, after replacing the first credential with the second credential, an operation of allowing a particular device to use the first credential to access the one or more resources during the predetermined period is performed and operates to provide time within the predetermined period for the system administrator to update the particular device with the second credential.

8. The system of claim 1, wherein the machine readable instructions are further configured to discover an attempt by a particular device to access the one or more resources using the first credential.

9. A method comprising:
receiving a first request to replace a first credential used to access one or more resources with a second credential that is to be subsequently used to access the one or more resources;
in response to receiving the first request, perform a transitional secret procedure by replacing the first credential with the second credential and by allowing temporary subsequent use of the first credential to access the one or more resources for a predetermined period, wherein a length of the predetermined period is based on a determined level of access associated a requesting device that is using the first credential to request access to the one or more resources during the predetermined period, such that the predetermined period is different for different levels of access;
as a part of performing the transitional secret procedure, causing the transitional secret procedure to be transparent to the requesting device such that only a central authentication system, which grants or denies requests to access the one or more resources, is knowledgeable that both the first credential and the second credential are usable to access the one or more resources during the predetermined period; and
in response to receiving a second request to access the one or more resources using the first credential after replacing the first credential with the second credential, where the second request is received from the requesting device:
allowing to access the one or more resources using the first credential during the predetermined period, wherein both the first credential and the second credential are usable to access the one or more resources during the predetermined period, which is based on the determined level of access of the requesting device; and
indicating to a system administrator that the first credential was used to access the one or more resources.

10. The method of claim 9, wherein resetting the second credential is available only when the second credential is used to access the one or more resources such that the first credential cannot be used to reset the second credential.

11. The method of claim 9, further comprising:
invalidating the first credential after the predetermined period expires; and denying access to the one or more resources when the first credential is used after the predetermined period expires.

12. The method of claim 9, wherein the method further comprises indicating to the system administrator an attempt by a particular device to access the one or more resources using the first credential after the predetermined period expires.

13. The method of claim 9, wherein the method further comprises identifying a particular device that is making an unauthorized attempt to access the one or more resources by detecting an attempt by the particular device to access the one or more resources using the first credential after the predetermined period expires.

14. The method of claim 9, wherein, after replacing the first credential with the second credential, an operation of allowing a particular device to use the first credential to access the one or more resources during the predetermined period is performed and operates to prevent the replacement from causing a failure due to the use of the first credential by the particular device during the predetermined period.

15. The method of claim 9, wherein, after replacing the first credential with the second credential, an operation of allowing a particular device to use the first credential to access the one or more resources during the predetermined period is performed and operates to provide time within the predetermined period for the system administrator to update the particular device with the second credential.

16. The method of claim 9, wherein the method further comprises discovering an attempt by a particular device to access the one or more resources using the first credential.

17. One or more hardware storage device(s) having stored thereon computer-executable instructions that are executable by one or more processor(s) of a computer system to cause the computer system to:
  receive a first request to replace a first credential used to access one or more resources with a second credential that is to be subsequently used to access the one or more resources;
  in response to receiving the first request, perform a transitional secret procedure by replacing the first credential with the second credential and by allowing temporary subsequent use of the first credential to access the one or more resources for a predetermined period, wherein a length of the predetermined period is based on a determined level of access associated with a requesting device that is using the first credential to request access to the one or more resources during the predetermined period, such that the predetermined period is different for different levels of access;
  as a part of performing the transitional secret procedure, cause the transitional secret procedure to be transparent to the requesting device such that only the computer system, which operates as a central authentication system for granting or denying requests to access the one or more resources, is knowledgeable that both the first credential and the second credential are usable to access the one or more resources during the predetermined period; and
  in response to receiving a second request to access the one or more resources using the first credential after replacing the first credential with the second credential, where the second request is received from the requesting device:
    allow the requesting device to access the one or more resources using the first credential during the predetermined period, wherein both the first credential and the second credential are usable to access the one or more resources during the predetermined period, which is based on the determined level of access of the requesting device; and
    generate an indication for a system administrator that the first credential was used to access the one or more resources.

18. The one or more hardware storage device(s) of claim 17, wherein, as another part of the transitional secret procedure, the first credential is moved to a new location within a directory services of the computer system, which operates as the central authentication system.

19. The one or more hardware storage device(s) of claim 18, wherein the new location is a transitional password field.

20. The one or more hardware storage device(s) of claim 17, wherein, when the requesting device, which used the first credential, is allowed access to the one or more resources during the predetermined period, access to the one or more resources is provided in accordance with a safe mode such that only limited access is provided to the requesting device.

* * * * *